(12) United States Patent
Asada et al.

(10) Patent No.: US 12,170,872 B2
(45) Date of Patent: Dec. 17, 2024

(54) PUBLIC ADDRESS SYSTEM

(71) Applicant: TOA Corporation, Hyogo (JP)

(72) Inventors: Kazuma Asada, Hyogo (JP); Ryosuke Ozaki, Hyogo (JP)

(73) Assignee: TOA CORPORATION, Hyogo (JP)

( * ) Notice: Subject to any disclaimer, the term of this patent is extended or adjusted under 35 U.S.C. 154(b) by 193 days.

(21) Appl. No.: 18/009,743

(22) PCT Filed: Jun. 30, 2020

(86) PCT No.: PCT/JP2020/025737
§ 371 (c)(1),
(2) Date: Dec. 12, 2022

(87) PCT Pub. No.: WO2022/003844
PCT Pub. Date: Jan. 6, 2022

(65) Prior Publication Data
US 2023/0247377 A1    Aug. 3, 2023

(51) Int. Cl.
*H04B 3/00*    (2006.01)
*H04R 1/04*    (2006.01)
*H04R 27/00*    (2006.01)

(52) U.S. Cl.
CPC ............... *H04R 27/00* (2013.01); *H04R 1/04* (2013.01)

(58) Field of Classification Search
CPC .................................. H04R 27/00; H04R 1/04
See application file for complete search history.

(56) References Cited

U.S. PATENT DOCUMENTS

| | | |
|---|---|---|
| 11,075,540 B2 | 7/2021 | Shigeta |
| 2009/0110214 A1* | 4/2009 | Litovsky ............ H02J 7/00047 381/104 |

(Continued)

FOREIGN PATENT DOCUMENTS

| | | |
|---|---|---|
| EP | 3139630 A1 | 3/2017 |
| WO | 2007082388 A1 | 7/2007 |
| WO | 2020021591 A1 | 1/2020 |

OTHER PUBLICATIONS

International Search Report and Written Opinion issued in corresponding International Patent Application No. PCT/JP2020/025737 (with English translation of International Search Report) dated Sep. 29, 2020 (6 pages).

(Continued)

*Primary Examiner* — Simon King
(74) *Attorney, Agent, or Firm* — Kilyk & Bowersox, P.L.L.C.

(57) ABSTRACT

Provided is a public address device that facilitates recognizing a sound while performing power control so that input power does not exceed upper-limit supply power of a power source device. Included are a voltage transforming unit 204 that performs voltage transformation of a direct-current power source input from a power source device 10; a power amplifier 202 that amplifies a sound signal using the direct-current power source after the voltage transformation to generate a driving signal that drives an electroacoustic transducer; a power detection unit 205 that detects input power from the power source device 10; a threshold holding unit 207 that holds a power determination threshold Pth corresponding to upper-limit supply power of the power source device 10; a voltage control unit 206 that controls an output voltage of the voltage transforming unit 204 on the basis of the input power Pi and the power determination threshold Pth; and a charge accumulation unit 208 that is (Continued)

connected between the voltage transforming unit 204 and the power amplifier 202, and supplies a power source to the power amplifier 202 when the output voltage of the voltage transforming unit 204 drops.

7 Claims, 9 Drawing Sheets

(56) References Cited

U.S. PATENT DOCUMENTS

| | | | |
|---|---|---|---|
| 2015/0022368 A1* | 1/2015 | Smith | G08B 21/18 |
| | | | 340/693.3 |
| 2016/0197588 A1* | 7/2016 | Olson | H03F 1/0227 |
| | | | 381/120 |
| 2016/0343241 A1* | 11/2016 | Rossi | G08B 29/126 |
| 2017/0237580 A1 | 8/2017 | Radermacher et al. | |
| 2018/0160282 A1 | 6/2018 | van de Poll | |
| 2018/0337601 A1* | 11/2018 | Vadnerkar | H02M 3/158 |
| 2023/0111696 A1* | 4/2023 | Souza | H03F 1/0222 |
| | | | 330/136 |

OTHER PUBLICATIONS

Extended European Search Report issued in corresponding European Patent Application 20943746.6 dated Mar. 11, 2024 (7 pages).

* cited by examiner

| STANDARD | POWER CLASS | UPPER-LIMIT SUPPLY POWER (Pmax) |
|---|---|---|
| PoE (IEEE802.3af) | 1 | 3.84 W |
| | 2 | 6.49 W |
| | 0, 3 | 12.95 W |
| PoE+ (IEEE802.3at) | 4 | 25.5 W |
| PoE++ (IEEE802.3bt) | 5 | 40.0 W |
| | 6 | 51.0 W |
| | 7 | 62.0 W |
| | 8 | 73.0 W |

COMPARATIVE EXAMPLE 1
(loudspeaker output in case where power limitation is not performed)

FIG. 5

COMPARATIVE EXAMPLE 2
(loudspeaker output in case where voltage limitation is performed)

FIG. 10

PUBLIC ADDRESS SYSTEM

This application is a National Stage Application of PCT/JP2020/025737, filed Jun. 30, 2020.

TECHNICAL FIELD

The present invention relates to a public address device, and more particularly to improvement to a public address device that operates by receiving power source supply from a power source device.

BACKGROUND ART

A public address system that transmits information by sound to sojourners in an indoor or outdoor address area is known. The public address system includes one or more public address devices. Each of the public address devices includes a power amplifier that amplifies a sound signal to generate a loudspeaker driving signal, and a loudspeaker that converts the loudspeaker driving signal into a sound wave, whereby each of the public address devices outputs a sound corresponding to the sound signal. Most of the power consumption in the public address device is the power consumption of the power amplifier. Therefore, the power consumption of the public address device fluctuates according to the sound signal. Therefore, in a case where power source is supplied from an external power source device, the input power input into the public address device greatly fluctuates.

In a case where the power source capacity of the power source device has a sufficient margin, the fluctuation of the input power input into the public address device does not cause a problem. However, the power source capacity of the power source device may not be sufficient, and upper-limit supply power that can be supplied to the public address device may be smaller than the maximum power consumption of the public address device. In such a case, the power consumption of the public address device needs to be suppressed not to exceed the upper-limit supply power.

For example, the power source voltage of the power amplifier can be dropped to suppress the power consumption in the power amplifier. However, when the power source voltage drops, the loudspeaker output drops, and there is a problem that it is difficult for the listeners in the address area to recognize and understand the sound.

In addition, even if power source voltages are the same, the "maximum undistorted power" of undistorted sine wave power is about 50% of square wave power. Therefore, as the power source voltage, a value at which the upper-limit supply power is not exceeded even if a sound signal is a square wave needs to be determined. Therefore, in a case where a sound signal is a sine wave, only 50% of the upper-limit supply power can be used, and there is a problem that it is difficult to secure necessary loudspeaker output in a case where the power source capacity of the power source device is insufficient.

Further, in a case of a power source device conforming to PoE (power over Ethernet) defined by the IEEE (Institute of Electrical and Electronics Engineers) 802.3af standard or PoE+ defined by the higher standard IEEE 802.3at, in a case where a public address device as a powered device consumes power exceeding the upper-limit supply power, it is necessary to immediately stop the power source supply and reset the public address device to restart the power source supply. Therefore, there is a problem that it is difficult to secure sufficient loudspeaker output in a case where power source is supplied from a power source device conforming to PoE.

SUMMARY OF INVENTION

Technical Problem

The present invention has been made in view of the above circumstances, and an object of the present invention is to provide a public address device that facilitates recognizing a sound while performing power control so that input power does not exceed upper-limit supply power of a power source device.

Solution to Problem

A public address device according to a first aspect of the present invention includes: a voltage transforming unit that performs voltage transformation of a direct-current power source input from a power source device; a power amplifier that amplifies a sound signal using the direct-current power source after the voltage transformation to generate a driving signal that drives an electroacoustic transducer; a power detection unit that detects input power from the power source device; a threshold holding unit that holds a power determination threshold corresponding to upper-limit supply power of the power source device; a voltage control unit that controls an output voltage of the voltage transforming unit on the basis of the input power and the power determination threshold; and a charge accumulation unit that is connected between the voltage transforming unit and the power amplifier, and supplies a power source to the power amplifier when the output voltage of the voltage transforming unit drops.

Such a configuration is adopted, so that the direct-current power source input from the power source device is supplied to the power amplifier via the voltage transforming unit, and the output voltage of the voltage transforming unit can be controlled on the basis of the input power from the power source device. Therefore, the input power can be controlled not to exceed the upper-limit supply power.

In addition, immediately after the output of the voltage transforming unit drops, a power source can be supplied to the power amplifier from the charge accumulation unit. Therefore, while the input power from the power source device is limited, it is possible to supply the power amplifier with power larger than the input power.

In addition, for at least the beginning of a continuous-sound output period, a sound can be output without receiving the limitation of the input power. Therefore, the listeners in the address area easily recognize the sound output from the public address device.

In a public address device according to a second aspect of the present invention, in addition to the above configuration, the power detection unit may include a current detection unit that detects an output current of the voltage transforming unit, and the power detection unit may calculate the input power on the basis of the output voltage and the output current of the voltage transforming unit.

In a public address device according to a third aspect of the present invention, in addition to the above configuration, the upper-limit supply power may be determined in a negotiation with the power source device, on the basis of a predefined protocol, before a start of power source supply from the power source device.

In a public address device according to a fourth aspect of the present invention, in addition to the above configuration, the supply device may perform power supply in accordance with an IEEE 802.3 standard having a plurality of power classes, the public address device may further include a PoE interface unit that determines one power class from the plurality of power classes through a negotiation with the power source device, in accordance with the IEEE 802.3 standard, before a start of power source supply from the power source device, and the upper-limit supply power may be upper-limit supply power defined by the IEEE 802.3 standard corresponding to the power class determined by the PoE interface unit.

In a public address device according to a fifth aspect of the present invention, in addition to the above configuration, in a case where the input power exceeds the power determination threshold, the voltage control unit may control the output voltage so that the output voltage becomes a first voltage, and in a case where the input power is equal to or less than the power determination threshold, the voltage control unit may control the output voltage so that the output voltage becomes a second voltage higher than the first voltage, and the first voltage may be a value at which the input power does not exceed the upper-limit supply power in a case where the driving signal is at maximum power.

In addition to the above configuration, a public address device according to a sixth aspect of the present invention may further include an amplitude limitation unit that performs amplitude limitation of the sound signal on the basis of a result of comparison between a terminal voltage of the charge accumulation unit and a predefined voltage determination threshold. The voltage determination threshold may be a value between the first voltage and the second voltage.

In a public address device according to a seventh aspect of the present invention, in addition to the above configuration, the amplitude limitation of the charge accumulation unit may end after a predefined amplitude limitation period elapses.

Effects of Invention

According to the present invention, it is possible to provide a public address device that facilitates recognizing a sound while performing power control so that input power does not exceed upper-limit supply power of a power source device.

DESCRIPTION OF EMBODIMENTS

First Embodiment

Figure 1:
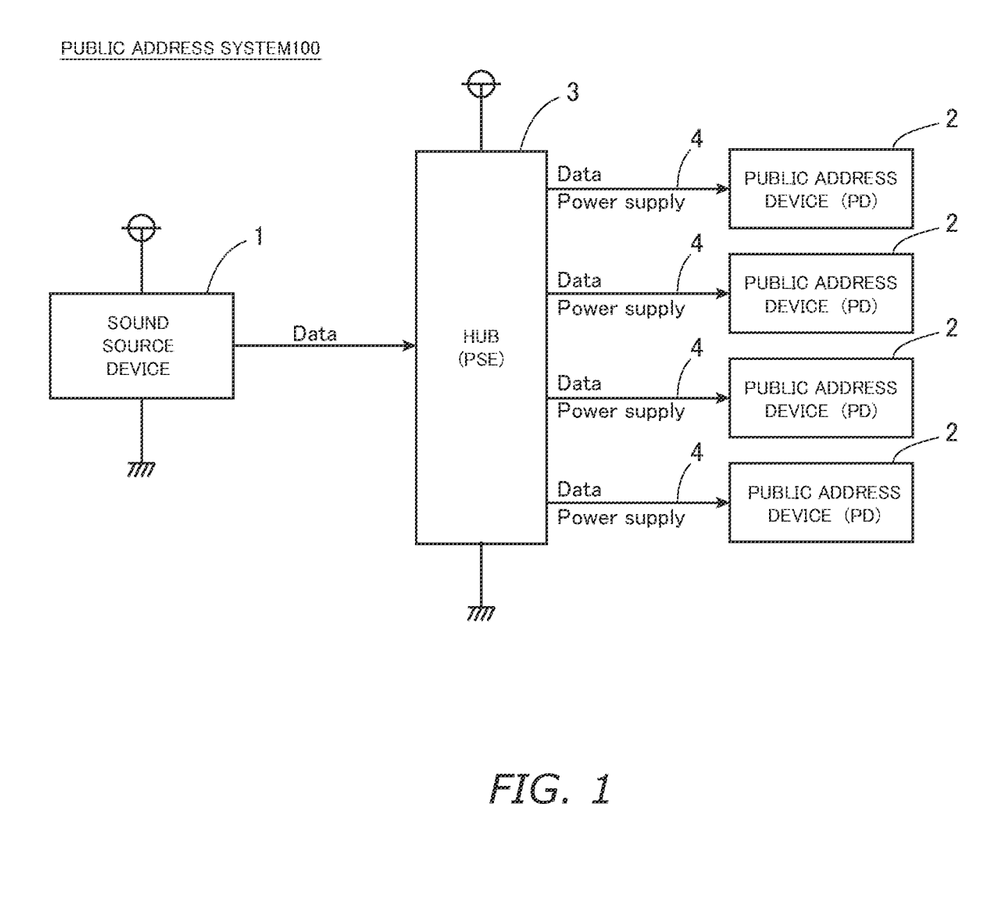
FIG. 1 is a diagram illustrating a configuration example of a public address system 100 including public address devices 2 according to a first embodiment of the present invention.

FIG. 1 is a diagram illustrating a configuration example of a public address system 100 including public address devices 2 according to a first embodiment of the present invention. The public address system 100 includes a sound source device 1 that generates sound data, the public address devices 2 that reproduce sound, and a switching hub 3 that relays the sound data between the sound source device 1 and the public address devices 2.

The public address system 100 is a system that transmits information by sound to sojourners in a predefined indoor or outdoor address area, and is, for example, a public address (PA) system installed in an office building, a shopping center, a station, an airport, a school, a concert hall, a ground, and the like. The sound used for the information transmission includes utterance sound, music, warning sound, such as a disaster warning, sound effects, such as chime, and the like.

The sound source device 1 is a device that generates packet data including sound data or control data, and generates, for example, an Internet Protocol (IP) packet capable of Internet Protocol communication. The sound data includes sound information, such as input sound input from a microphone or the like, recorded sound preliminarily held in a storage medium, and synthesized sound generated by an electronic sound source. The control data is control data for the public address device 2, and is, for example, data that designates sound data (built-in sound data), such as recorded sound, held in the public address device 2. The generated packet data is transmitted from the sound source device 1 to the public address device 2. The packet data is transmitted out to a designated destination. In a case where two or more public address devices 2 are connected to one sound source device 1, the same packet data or different pieces of packet data can be transmitted out to the public address devices 2.

The public address device 2 is a sound reproducing device that reproduces sound, and emits the reproduced sound to the address area. The public address device 2 receives packet data from the sound source device 1, and reproduces sound by extracting sound data and control data from the packet data. The public address device 2 is used, for example, for public address, such as business address and emergency address.

The switching hub 3 is a relay device that receives packet data from the sound source device 1, and transmits the packet data to the public address device 2 corresponding to the destination. The sound source device 1 is connected to the switching hub 3 in a wired or wireless manner, and the public address devices 2 are connected to the switching hub 3 using cables 4. The sound source device 1 and the public address devices 2 may be connected with each other with two or more switching hubs 3 interposed therebetween. Alternatively, the sound source device 1 and the public address devices 2 can be directly connected with each other using the cables 4 without the switching hub 3 interposed therebetween.

The public address device 2 receives packet data and receives power source supply via the cable 4. Power supply between the public address device 2 and the switching hub 3 conforms to, for example, PoE (power over Ethernet) defined by the IEEE (Institute of Electrical and Electronics Engineers) 802.3af standard and PoE+ defined by the IEEE 802.3at standard, and the switching hub 3 is used as a power source device (PSE), and the public address device 2 is used as a powered device (PD). Note that in a case where the sound source device 1 and the public address devices 2 are connected with each other with the cables 4 without the switching hub 3 interposed therebetween, the sound source device 1 is used as a power source device.

The cable 4 incorporates four twisted pairs each including two twisted conductive wires, and these twisted pairs are allocated for data communication or power source supply. Alternatively, one of the twisted pairs can also be used for both data communication and power source supply. Therefore, power source supply and data communication can be simultaneously performed between the public address device 2 and the switching hub 3 only by the connection using the single cable 4.

Due to the usage of the cables 4, it is not necessary to lay power source lines when the public address devices 2 are installed, and installation work of the public address devices 2 can be facilitated. For example, in a case where the public address devices 2 are installed in a place where installation work is difficult, such as a ceiling, it is possible to omit laying the power source lines, and thus, it is possible to suppress the installation cost and improve the degree of freedom of the installation place of the public address devices 2.

Figure 2:
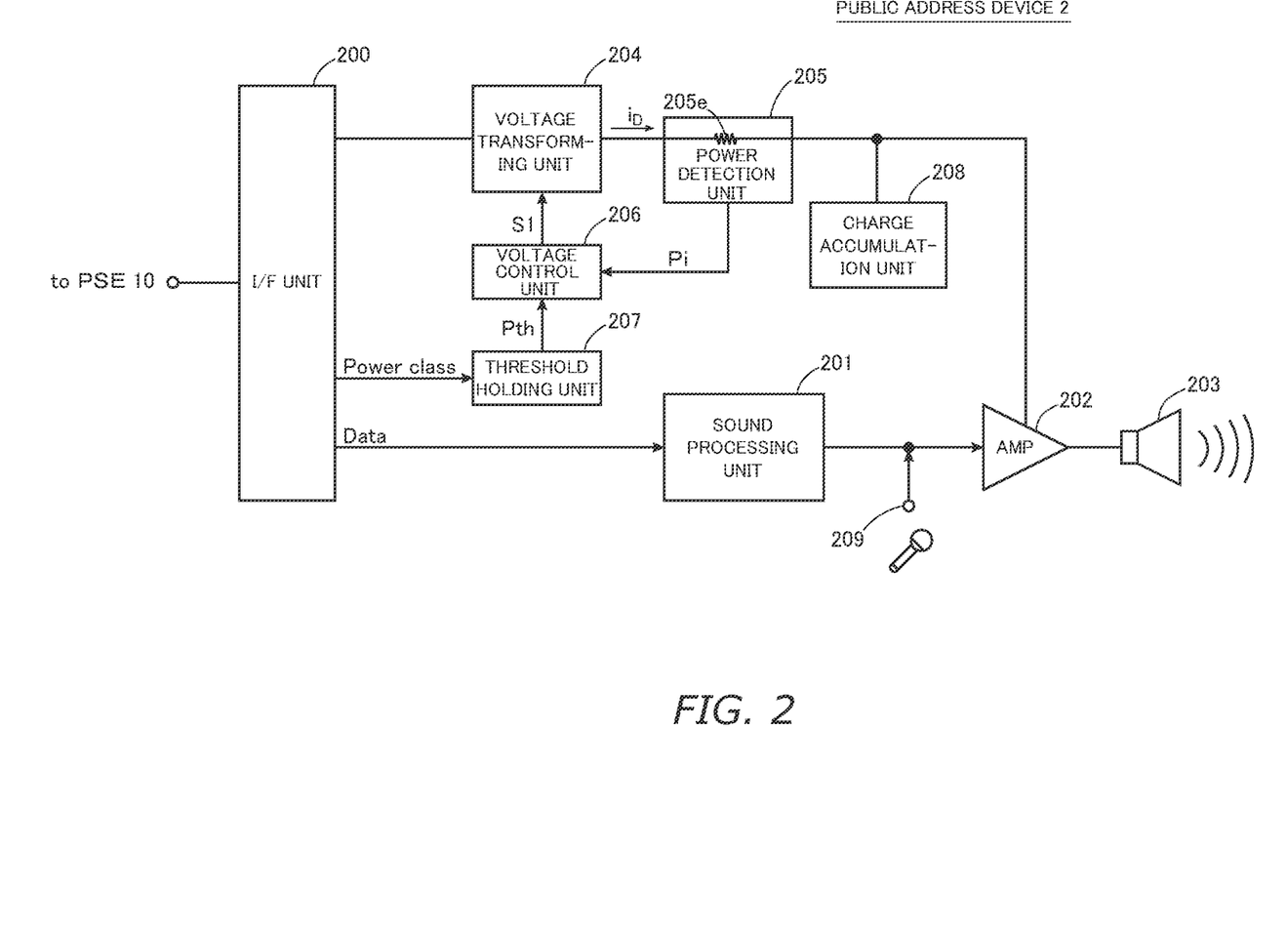
FIG. 2 is a block diagram illustrating a configuration example of the public address device 2 of FIG. 1.

FIG. 2 is a block diagram illustrating a configuration example of the public address device 2 of FIG. 1. The public address device 2 includes an interface unit 200, a sound processing unit 201, a power amplifier 202, a loudspeaker 203, a voltage transforming unit 204, a power detection unit 205, a voltage control unit 206, a threshold holding unit 207, a charge accumulation unit 208, and a sound input terminal 209. In addition, the public address device 2 is connected with a power source device 10, such as the sound source device 1 or the switching hub 3, via the cable 4.

The interface unit 200 performs two-way communication with the power source device 10, and is supplied with a direct-current power source from the power source device 10. The interface unit 200 also outputs sound data or control data to the sound processing unit 201, outputs a power class to the threshold holding unit 207, and further supplies a direct-current power source to each block in the public address device 2.

The direct-current power source supplied from the power source device 10 is input into the voltage transforming unit 204, and is also supplied as a driving power source to the sound processing unit 201, the voltage control unit 206, the threshold holding unit 207, and the like.

The interface unit 200 performs negotiations with the power source device 10 to determine a power class, and outputs, into the threshold holding unit 207, threshold power Pth corresponding to the determined power class. The negotiations with the power source device 10 are performed according to a predefined protocol when the public address device 2 is connected to the power source device 10 and power source supply from the power source device 10 is started. For example, performed are negotiations between a power source device and a powered device defined by the IEEE 802.3af standard or the IEEE 802.3at standard.

The power class is associated with upper-limit supply power Pmax. When the power class is determined, the maximum power that can be supplied from the power source device 10 to the public address device 2 is determined. Therefore, when after the determination of the power class, the power consumption in the public address device 2 exceeds the upper-limit supply power Pmax corresponding to the power class, the power supply from the power source device 10 is immediately stopped. That is, the power source device 10 is configured to detect power consumption in the public address device 2 at a predetermined cycle, and stop the power supply when the detected power consumption exceeds the upper-limit supply power Pmax corresponding to the power class.

The threshold power Pth is determined on the basis of the upper-limit supply power Pmax. The power determination threshold Pth is a threshold for performing voltage control of the voltage transforming unit 204 such that input power input into the public address device 2 does not exceed the upper-limit supply power Pmax. For example, the same value as the upper-limit supply power Pmax corresponding to the power class or a value obtained by considering a predetermined margin for the upper-limit supply power Pmax corresponding to the power class can be set as the power determination threshold Pth.

Figure 3:
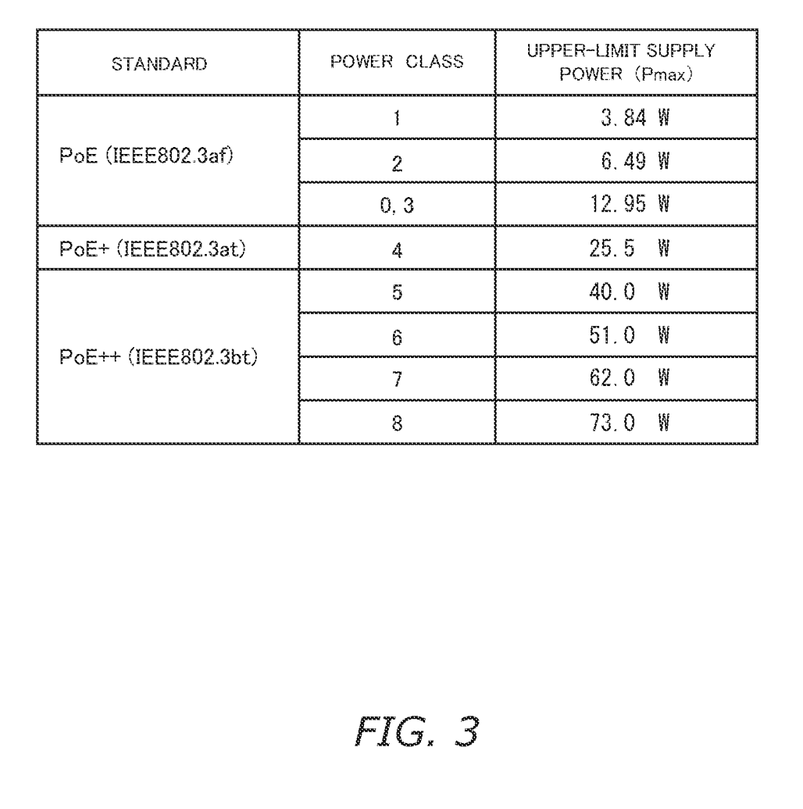
FIG. 3 is a diagram showing the power classes and the upper-limit supply power Pmax defined by the IEEE 802.3af, IEEE 802.3at or IEEE 802.3bt standards.

FIG. 3 is a diagram showing an example of the power classes set across the above three standards PoE, PoE+, and PoE++, and the upper-limit supply power Pmax defined for each power class. When the power class is determined by the negotiations, the upper-limit supply power Pmax corresponding to the power class becomes known. For example, in a case where the negotiations determine a power class 4, it becomes known that the upper-limit supply power Pmax is 25.5 W, and 25.5 W or a value slightly less than 25.5 W is determined as the threshold power Pth. The interface unit 200 holds a table in which a plurality of power classes that can be specified by the negotiations is associated with the upper-limit supply power Pmax for each power class, as illustrated in FIG. 3, and determines, with reference to the table, the threshold power Pth corresponding to the power class specified by the negotiations. Alternatively, the threshold power Pth can be preliminarily determined on the basis of the upper-limit supply power Pmax corresponding to each power class, a table in which each power class is associated with the threshold power Pth can be held, and with reference to the table, the threshold power Pth corresponding to the power class specified by the negotiations can be determined.

When receiving packet data from the power source device 10, the interface unit 200 extracts sound data or control data from the packet data and outputs the sound data or the control data into the sound processing unit 201.

On the basis of the sound data or control data input from the interface unit 200, the sound processing unit 201 generates a sound signal as an analog signal or a digital signal. The sound signal can be generated on the basis of the sound data received from the power source device 10. Alternatively, among two or more pieces of sound data (built-in sound data) preliminarily held by the sound processing unit 201, on the basis of the sound data designated by the control data, a sound signal can also be generated. Alternatively, in a case where both sound data and control data are included in packet data received from the power source device 10, the sound processing unit 201 can also generate a sound signal obtained by mixing a sound signal based on the sound data and a sound signal based on the built-in sound data designated by the control data.

The sound input terminal 209 is a terminal that is connected to an external sound source, such as a microphone, to receive input of a sound signal from the external sound source. The sound input terminal 209 is connected between the sound processing unit 201 and the power amplifier 202. A sound signal input via the sound input terminal 209 is supplied to the power amplifier 202.

The power amplifier 202 is an amplification circuit that performs power amplification of a sound signal to generate a loudspeaker driving signal for driving the loudspeaker 203. The power amplifier 202 is supplied with a driving power source via the voltage transforming unit 204. The power amplifier 202 amplifies a sound signal input from the sound processing unit 201, a sound signal input from the sound input terminal 209, or a sound signal obtained by mixing these. The loudspeaker 203 is a means of converting the loudspeaker driving signal from the power amplifier 202 into a sound wave, and outputting the sound wave to the address area.

The output power of the loudspeaker 203 (hereinafter referred to as loudspeaker output) can be regarded as the power consumption of the power amplifier 202. The power consumption of the power amplifier 202 varies according to the sound signal, and also varies according to a power source voltage supplied to the power amplifier 202. Therefore, for example, when the amplitude of the sound signal increases, the loudspeaker output also increases, and when the amplitude decreases, the loudspeaker output also decreases. In addition, when the voltage of the driving power source of the power amplifier 202 increases, the maximum output power of the loudspeaker 203 increases, and when the voltage of the driving power source of the power amplifier 202 drops, the maximum output power of the loudspeaker 203 also decreases.

The voltage transforming unit 204 is a DC-DC converter that performs voltage transformation of a direct-current power source, and converts the voltage of the input power source from the interface unit 200, into a different voltage. The output voltage of the voltage transforming unit 204 is controlled on the basis of a voltage control signal S1 of the voltage control unit 206, and outputs either a higher voltage V2 or a lower voltage V1. For example, in a case where the input voltage is 44 to 57 V, the output voltage can be set such that the higher voltage V2 is 17 V and the lower voltage V1 is 12 V.

The power detection unit 205 is a means of detecting input power Pi from the power source device 10. The power detection unit 205 includes a current detection unit 205e that detects an output current $i_D$ of the voltage transforming unit 204, and, on the basis of the detected current value, calculates the input power Pi from the power source device 10. The output current $i_D$ of the voltage transforming unit 204 is detected, for example, by connecting a small resistor, in series, to an output terminal of the voltage transforming unit 204, and measuring the voltage between terminals of the resistor. Since the current detection unit 205e is provided between the voltage transforming unit 204 and the charge accumulation unit 208, the output current $i_D$ of the voltage transforming unit 204 can be measured without the effect of the discharge of the charge accumulation unit 208.

Most of the input power from the power source device 10 receives voltage transformation in the voltage transforming unit 204, and is supplied to the power amplifier 202 or the charge accumulation unit 208, and finally becomes loudspeaker output. Therefore, the output power of the voltage transforming unit 204 can be regarded as the input power from the power source device 10. The output power of the voltage transforming unit 204 can be calculated from the output voltage and the output current $i_D$ of the voltage transforming unit 204, and the output voltage of the voltage transforming unit 204 is a known value controlled by the voltage control unit 206. Therefore, the input power from the power source device 10 can be calculated on the basis of a current detected by the current detection unit 205e.

The voltage control unit 206 is a means of controlling the output voltage of the voltage transforming unit 204 according to the input power from the power source device 10, and performs the control so that the input power does not exceed the upper-limit supply power Pmax. The voltage control unit 206 generates the voltage control signal S1 on the basis of the input power calculated by the power detection unit 205, and controls the output voltage of the voltage transforming unit 204.

The voltage control signal S1 is generated by comparing the input power from the power source device 10 with the power determination threshold Pth held by the threshold holding unit 207. For example, when the input power is equal to or less than the power determination threshold Pth, the voltage control signal S1 designating the higher voltage V2 (second voltage) is generated, and when the input power exceeds the power determination threshold Pth, the voltage control signal S1 designating the lower voltage V1 (first voltage) is output. The lower voltage V1 is preliminarily determined as a power source voltage of the power amplifier 202 at which the loudspeaker output does not exceed the upper-limit supply power Pmax even in a case where a sound signal that makes the loudspeaker output maximum is output from the sound processing unit 201.

The threshold holding unit 207 is a means of holding the power determination threshold Pth. The power determination threshold Pth is defined on the basis of the power class determined by the interface unit 200. For example, a value obtained by considering a predetermined margin for the upper-limit supply power Pmax corresponding to the power class can be set as the power determination threshold Pth. In the present embodiment, however, an example in which, for convenience, the power determination threshold Pth matches the upper-limit supply power Pmax will be described.

The charge accumulation unit 208 is a capacitance element connected between the power amplifier 202 and the power detection unit 205. A terminal voltage of the charge accumulation unit 208 is a power source voltage of the power amplifier 202. The charge accumulation unit 208 is charged when the voltage transforming unit 204 outputs the higher voltage V2. When the voltage transforming unit 204 outputs the lower voltage V1, the charge accumulation unit 208 discharges and supplies the accumulated charges to the power amplifier 202. That is, the loudspeaker output is supplied by the voltage transforming unit 204 and the charge accumulation unit 208.

Figure 4:
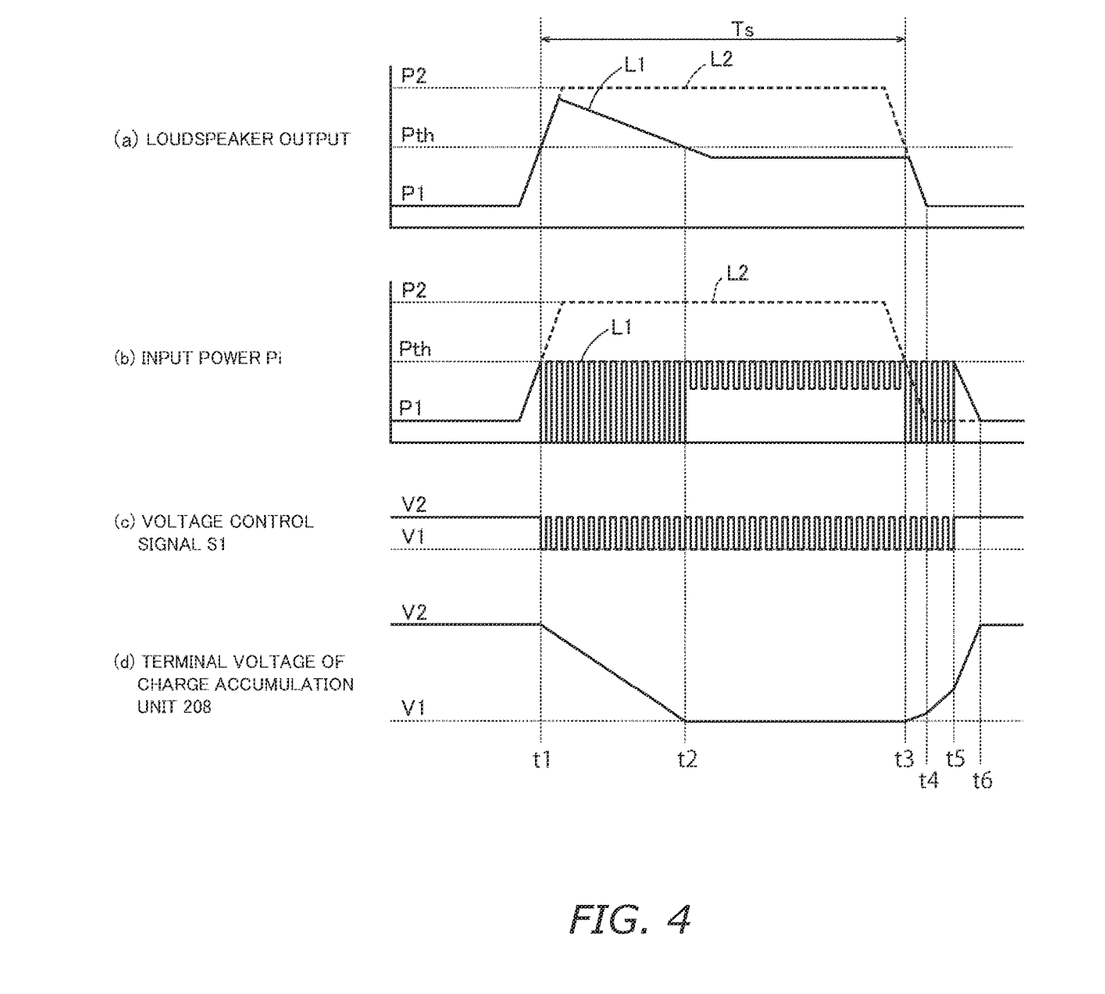
FIG. 4 is a timing chart illustrating an example of the operation of the public address device 2 of FIG. 2.

FIG. 4 is a timing chart illustrating an example of the operation of the public address device 2 of FIG. 2, and illustrates a state in a case where a sound signal for outputting a short sound of less than one second with large volume is given, for example. In FIG. 4, (a) illustrates the output power of the loudspeaker 203, (b) illustrates the input power Pi supplied from the power source device 10, (c) illustrates the voltage control signal S1 generated by the voltage control unit 206, and (d) illustrates the terminal voltage of the charge accumulation unit 208.

In (a) in FIG. 4, a characteristic L1 indicated by a solid line indicates a variation in the loudspeaker output in the public address device 2 of FIG. 2, and a characteristic L2 indicated by a broken line indicates a variation in the loudspeaker output in a case where it is assumed that the loudspeaker 203 can be driven just according to a sound signal. A characteristic L1 of a solid line and a characteristic L2 of a broken line illustrated in (b) in FIG. 4 are similarly illustrated for the input power Pi.

The sound signal varies such that the loudspeaker output is increased from the lower output to the higher output, and then is returned to the lower output again. The loudspeaker output at the higher output exceeds the upper-limit supply power Pmax. In FIG. 4, output power P1 of the loudspeaker 203 at the time of the lower output is a value smaller than the power determination threshold Pth. P2 in FIG. 4 is output power of the loudspeaker 203 at the time of the higher output, and is a value larger than the power determination threshold Pth. The sound signal varies the loudspeaker output from the lower power P1 to the higher power P2 across the power determination threshold Pth at time t1, and then varies the loudspeaker output from the higher power P2 to the lower power P1 across the power determination threshold Pth again at time t3.

In FIG. 4, during a continuous-sound output period Ts, a continuous sound is output in a case where the loudspeaker is driven just according to the sound signal to output a sound. The continuous sound herein refers to a continuing sound by which the loudspeaker output continues to exceed the upper-limit supply power Pmax. The continuous-sound output period Ts is an output period of such a continuous sound, and is a period ended by a pause period during which the loudspeaker output is equal to or less than the upper-limit supply power Pmax.

When the input power Pi is the lower power P1 smaller than the power determination threshold Pth, the voltage control unit 206 generates a voltage control signal S1 designating the higher voltage V2, and the voltage transforming unit 204 outputs the higher voltage V2. In FIG. 4, initially, such a state continues, and the charge accumulation unit 208 has been charged to the higher voltage V2.

Thereafter, the loudspeaker output increases and reaches the power determination threshold Pth (time t1). Thereafter, the output voltage of the voltage transforming unit 204 vibrates to go back and forth between the lower voltage V1 and the higher voltage V2, so that the input power is suppressed.

In a state where the voltage transforming unit 204 is outputting the higher voltage V2, when the loudspeaker output reaches the power determination threshold Pth, the input power Pi also reaches the power determination threshold Pth. Therefore, the voltage control unit 206 generates a voltage control signal S1 designating the lower voltage V1, and the output voltage of the voltage transforming unit 204 is switched to the lower voltage V1. However, when the output voltage of the voltage transforming unit 204 is switched to the lower voltage V1, the output voltage becomes lower than the terminal voltage of the charge accumulation unit 208. Therefore, power source supply to the power amplifier 202 is performed by the charge accumulation unit 208, the output current $i_D$ becomes zero, and the input power Pi also becomes substantially zero. As a result, the voltage control unit 206 generates a voltage control signal S1 designating the higher voltage V2, and the output voltage of the voltage transforming unit 204 is switched to the higher voltage V2 again.

That is, after time t1, the voltage control signal S1 is alternately switched between the higher voltage V2 and the lower voltage V1, so that the output voltage of the voltage transforming unit 204 vibrates to go back and forth between the higher voltage V2 and the lower voltage V1. For example, a cycle of the vibration is 20 microseconds. This cycle is set to a cycle in which the supply device 10 detects the power consumption of the public address device 2, for example, is set to a cycle sufficiently faster than several milliseconds to several tens of milliseconds. The output voltage is vibrated in this manner, so that it is possible to perform power limitation such that the input power Pi does not exceed the power determination threshold Pth.

After time t1, the charge accumulation unit 208 discharges, and the terminal voltage of the charge accumulation unit 208 gradually drops from the higher voltage V2 and reaches the lower voltage V1 at time t2. That is, during time t1 to t2, power source supply to the power amplifier 202 is mainly performed by the charge accumulation unit 208. Therefore, it is possible to obtain the loudspeaker output exceeding the power determination threshold Pth while the input power is suppressed not to exceed the power determination threshold Pth.

After time t2, the voltage transforming unit 204 during the vibration performs power source supply to the power amplifier 202. At this time, the terminal voltage of the charge accumulation unit 208 maintains the lower voltage V1.

Thereafter, the loudspeaker output drops according to the sound signal, and reaches the power determination threshold Pth at time t3. The loudspeaker output further drops and falls below the power determination threshold Pth. At this time, since charging of the charge accumulation unit 208 is started, power used for the charging of the charge accumulation unit 208 is newly added to the input power. Therefore, even if the loudspeaker output becomes equal to or less than the power determination threshold Pth, the input power does not become equal to or less than the power determination threshold Pth, and the output voltage of the voltage transforming unit 204 continues to vibrate.

Here, the variation in which the output voltage of the voltage transforming unit 204 drops from the higher voltage V2 to the lower voltage V1 is quickly performed, while the variation in which the output voltage increases from the lower voltage V1 to the higher voltage V2 is gently performed according to a predetermined time constant. Therefore, even when the output voltage of the voltage transforming unit 204 is vibrating, when the loudspeaker output is less than the power determination threshold Pth, the charge accumulation unit 208 can be charged.

Thereafter, the loudspeaker output further drops, and the charging current of the charge accumulation unit 208 increases accordingly (time t3 to t4). However, the terminal voltage of the charge accumulation unit 208 gradually rises due to accumulation of charges, and the charging current starts to decrease. As a result, when the input power falls below the power determination threshold Pth, the output voltage of the voltage transforming unit 204 becomes the higher voltage V2, and stops the vibration (time t5). The charging of the charge accumulation unit 208 is continued thereafter, and when the terminal voltage reaches the higher voltage V2, the charging is ended (time t6).

Figure 5:
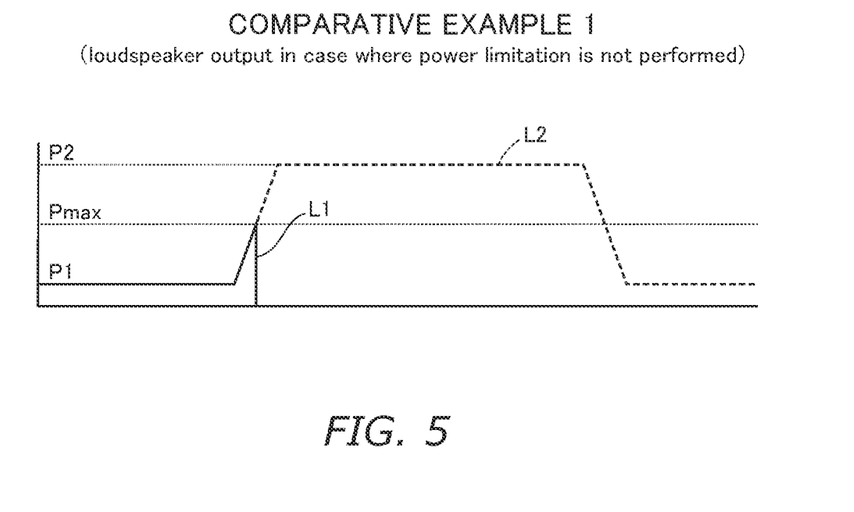
FIG. 5 illustrates loudspeaker output in a case where power limitation is not performed.
Figure 6:
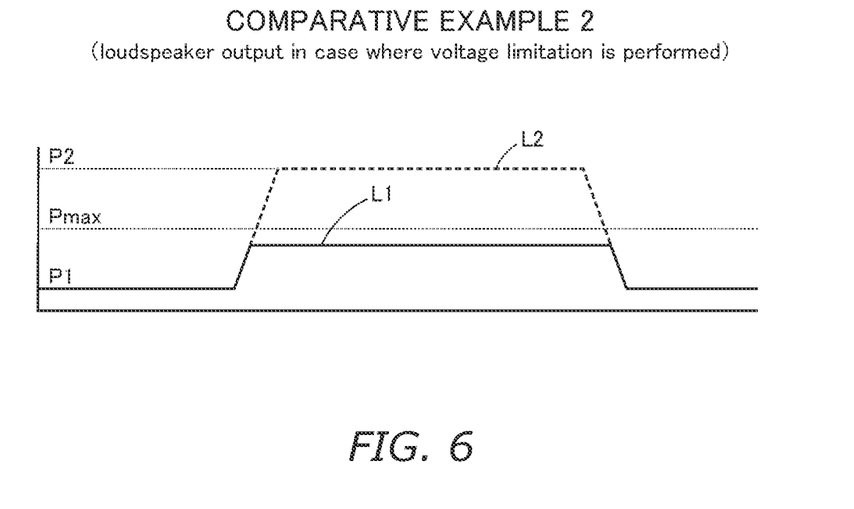
FIG. 6 illustrates loudspeaker output in a case where voltage limitation is performed.

FIGS. 5 and 6 are diagrams illustrating comparative examples to be compared with the public address device 2 according to the embodiment of the present invention. Each of FIGS. 5 and 6 is a diagram illustrating a variation in loudspeaker output in a conventional public address device.

FIG. 5 illustrates loudspeaker output in a case where power limitation is not performed. A characteristic L1 of a solid line and a characteristic L2 of a broken line illustrated in FIG. 5 are similar to those in the case of (a) of FIG. 4. Since power limitation is not performed, the power source supply from the power source device 10 is stopped when the loudspeaker output reaches the upper-limit supply power Pmax. Therefore, unless thereafter, the public address device 2 is reset and the power class negotiations with the power source device 10 is started, the operation cannot be restarted.

FIG. 6 illustrates loudspeaker output in a case where voltage limitation is performed. A characteristic L1 of a solid line and a characteristic L2 of a broken line illustrated in FIG. 6 are similar to those in the case of (a) of FIG. 4. As described above, the lower voltage V1 is a power source voltage of the power amplifier 202 at which the loudspeaker output does not exceed the upper-limit supply power Pmax regardless of a sound signal. Therefore, the output voltage of the voltage transforming unit 204 is maintained at the lower voltage V1, so that it is possible to prevent the input voltage from exceeding the upper-limit supply power Pmax. In this case, since the loudspeaker output simply decreases and does not exceed the upper-limit supply power Pmax, the sound is hard to listen to.

The public address device 2 according to the present embodiment supplies a power source to the power amplifier 202 via the voltage transforming unit 204, and controls the output voltage of the voltage transforming unit 204 on the basis of the input power from the power source device 10 to perform power limitation of the input power. For example, when the input power is equal to or more than the power determination threshold Pth, the output voltage of the voltage transforming unit 204 is dropped from the higher voltage V2 to the lower voltage V1. Therefore, the input power can be suppressed not to exceed the upper-limit supply power Pmax.

In addition, since the charge accumulation unit 208 is provided between the voltage transforming unit 204 and the power amplifier 202, a power source can be supplied to the power amplifier 202 from the charge accumulation unit 208 immediately after the output voltage of the voltage transforming unit 204 is dropped. Therefore, it is possible to obtain the loudspeaker output larger than the input power while limiting the input power from the power source device 10. That is, the loudspeaker output exceeding the upper-limit supply power Pmax can be performed while the input power is suppressed not to exceed the upper-limit supply power Pmax.

Particularly for at least the beginning of the continuous-sound output period Ts, a sound can be output using the charge accumulation unit 208 without receiving the limitation of the upper-limit supply power Pmax. In general, it is said that in a case where a continuous sound is to be recognized, it is important to clearly listen to the beginning. Therefore, since the beginning does not receive the limitation of the upper-limit supply power Pmax, the listeners in the address area easily recognize and understand the sound output from the public address device 2.

In addition, the current detection unit 205e is provided between the voltage transforming unit 204 and the charge accumulation unit 208 to detect the output current $i_D$ of the voltage transforming unit 204. On the basis of the output current $i_D$, the input power from the power source device 10 is calculated. Therefore, the input power can be quickly detected without being affected by the discharge of the charge accumulation unit 208.

In addition, the output voltage of the voltage transforming unit 204 is controlled on the basis of a result of comparison between the input power and the power determination threshold Pth, and the power determination threshold Pth is defined on the basis of the power class determined in the negotiations with the power source device 10. Therefore, the power limitation according to the power class can be performed.

Second Embodiment

In the first embodiment, an example of the public address device 2 that performs the power limitation of the input power has been described. On the other hand, in the present embodiment, will be described an example of a case where during the power limitation, amplitude limitation of a sound signal is further performed, so that charging of the charge accumulation unit 208 is promoted.

Figure 7:
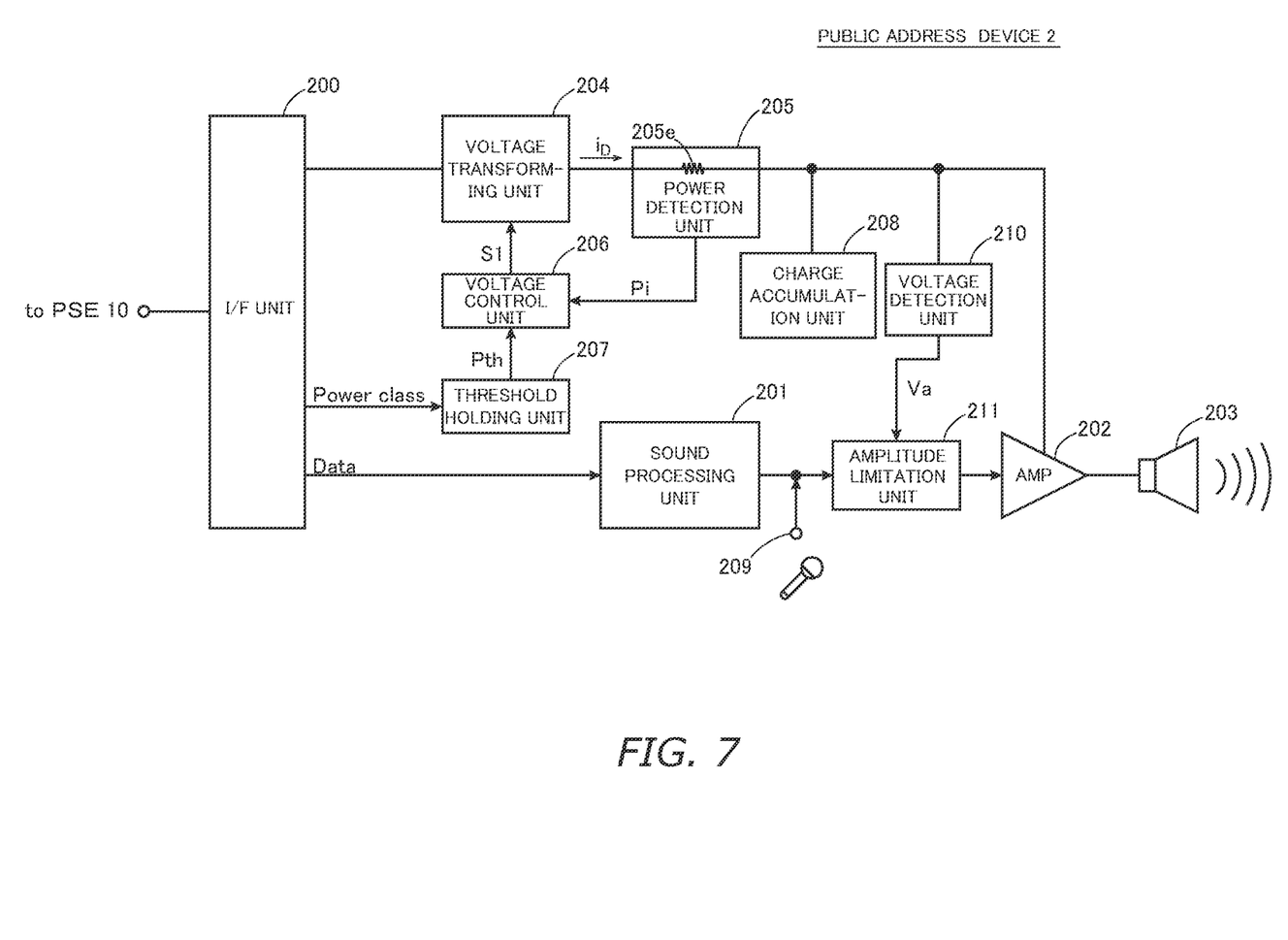
FIG. 7 is a diagram illustrating a configuration example of a public address device 2 according to a second embodiment of the present invention.

FIG. 7 is a diagram illustrating a configuration example of a public address device 2 according to a second embodiment of the present invention. This public address device 2 is different from the public address device 2 of FIG. 2 (first embodiment) in that this public address device 2 includes a voltage detection unit 210 and an amplitude limitation unit 211. Note that a configuration corresponding to the configuration illustrated in FIG. 2 is denoted by the same reference numerals, and the redundant description will be omitted.

The voltage detection unit 210 is a means of detecting a power source voltage supplied to a power amplifier 202, and is connected between a charge accumulation unit 208 and the power amplifier 202. The detected voltage Va is output into the amplitude limitation unit 211.

The amplitude limitation unit 211 is a means of performing amplitude limitation of a sound signal on the basis of the detected voltage Va. The amplitude limitation is a process of clipping the amplitudes of a sound signal, with a predefined value. That is, it is a process of replacing, among amplitudes of a sound signal, an amplitude exceeding a predetermined clipping value with the clipping value, and deleting the excess portion. Performing the amplitude limitation generates a large distortion in the reproduced sound, but can suppress loudspeaker power. For example, ⅓ of the maximum amplitude of a sound signal can be defined as the clipping value.

The amplitude limitation unit 211 compares the detected voltage Va with a voltage determination threshold Vth predefined. On the basis of the comparison result, the amplitude limitation unit 211 limits the amplitudes of a sound signal, and outputs, into the power amplifier 202, the sound signal that has received the amplitude limitation. The voltage determination threshold Vth is predefined as a value lower than a higher voltage V2 and higher than a lower voltage V1. For example, in a case where the higher voltage V2 is 17 V and the lower voltage V1 is 12 V, the voltage threshold can be set to 14 V.

When the detected voltage Va exceeds the voltage determination threshold Vth, the amplitude limitation unit 211 outputs, into the power amplifier 202, the input sound signal without performing the amplitude limitation. On the other hand, when the detected voltage Va is equal to or less than the voltage determination threshold Vth, the amplitude limitation unit 211 outputs, into the power amplifier 202, the sound signal that has received the amplitude limitation. This amplitude limitation is continued until an amplitude limitation time Td elapses after the detected voltage Va exceeds the voltage determination threshold Vth. The amplitude limitation time Td is, for example, a predefined constant time.

Figure 8:
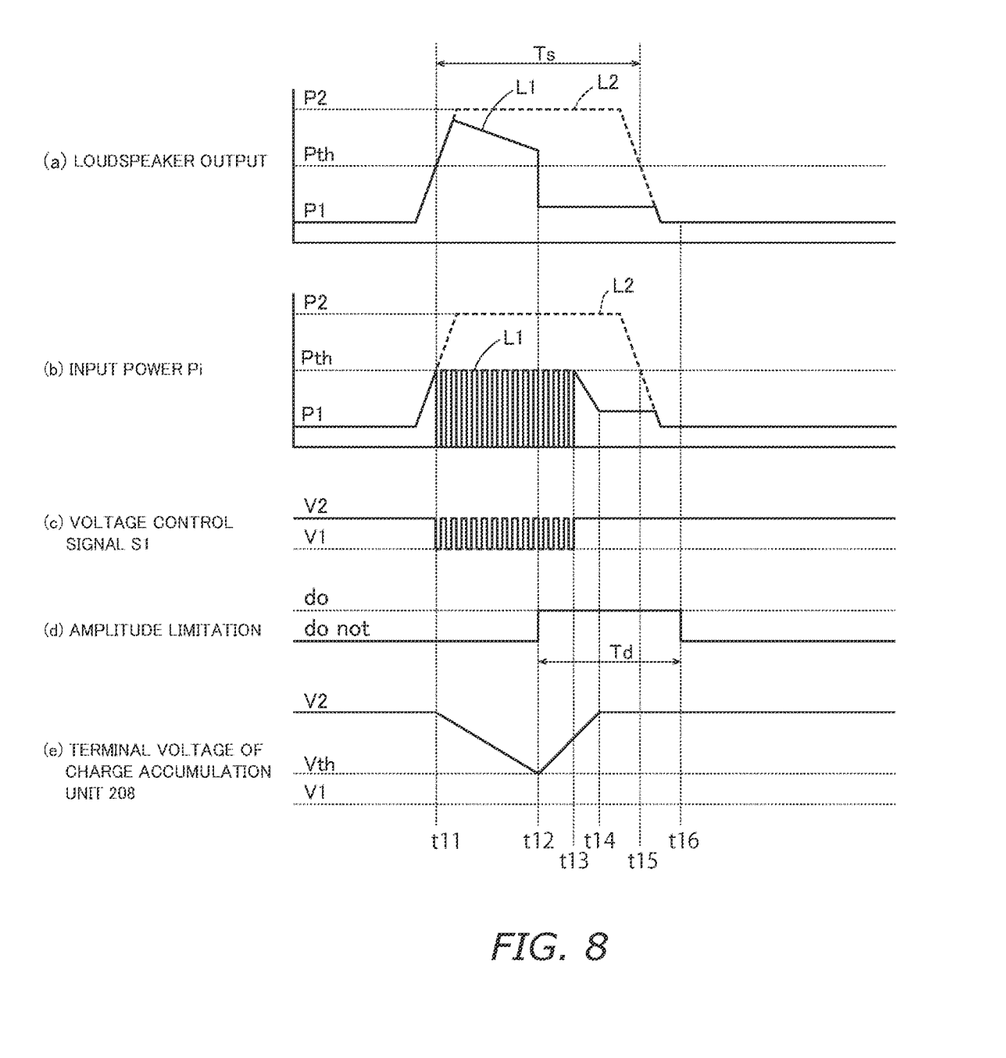
FIG. 8 is a timing chart illustrating an example of the operation of the public address device 2 of FIG. 7.

FIG. 8 is a timing chart illustrating an example of the operation of the public address device 2 of FIG. 7, and illustrates a state at a time when a sound signal for outputting a short sound of less than about one second with large volume is given, for example. In FIG. 8, (a) illustrates the output power of a loudspeaker 203, (b) illustrates the input power Pi supplied from a power source device 10, (c) illustrates a voltage control signal S1 generated by a voltage control unit 206, (d) illustrates an amplitude limitation process in the amplitude limitation unit 211, and (e) illustrates the terminal voltage of the charge accumulation unit 208. The difference between a characteristic L1 of a solid line and a characteristic L2 of a broken line illustrated in (a) and (b) in FIG. 8 is similar to the case in FIG. 4.

The operation until time t12 is the same as the operation until time t2 in FIG. 4. First, both the loudspeaker power and the input power are lower power P1 smaller than a power determination threshold Pth, a voltage transforming unit 204 outputs the higher voltage V2, and the charge accumulation unit 208 has been charged to the higher voltage V2. Thereafter, the loudspeaker output increases, and when the input power reaches the power determination threshold Pth at time t11, the output voltage of the voltage transforming unit 204 vibrates to go back and forth between the higher voltage V2 and the lower voltage V1, so that the input power is suppressed not to exceed the power determination threshold Pth.

At this time, power source supply to the power amplifier 202 is mainly performed by the charge accumulation unit 208. Therefore, the terminal voltage of the charge accumulation unit 208 gradually drops and reaches the voltage determination threshold Vth (time t12). At this time, the amplitude limitation of the sound signal by the amplitude limitation unit 211 is started. As a result, the loudspeaker output greatly drops to a value below the power determination threshold Pth, but the loudspeaker output drop is accompanied by the start of charging of the charge accumulation unit 208. As a result, since power used for the charging of the charge accumulation unit 208 is newly added to the input power, the output voltage of the voltage transforming unit 204 continues to vibrate.

Thereafter, the terminal voltage of the charge accumulation unit 208 gradually rises due to accumulation of charges, and the charging current gradually decreases. When the charging current decreases to a predetermined value, the input power becomes equal to or less than the power determination threshold Pth, and the power limitation is released (time t13). That is, the output voltage of the voltage transforming unit 204 stops vibrating and becomes the higher voltage V2.

Thereafter, the charging of the charge accumulation unit 208 still continues, but the charging current gradually decreases, and the input power gradually decreases accordingly. Then, when the terminal voltage of the charge accumulation unit 208 reaches the higher voltage V2, the charging is completed (time t14). Therefore, thereafter, the input power matches the loudspeaker output.

The amplitude limitation is released after the amplitude limitation time Td has elapsed. In FIG. 8, since the sound signal outputs a short sound, the loudspeaker output reaches the power determination threshold Pth at time t15, but the amplitude limitation is released at time t16 after time t15.

Such amplitude limitation is performed, so that charging of the charge accumulation unit 208 can be started before the end of a continuous-sound output period Ts, and the charging of the charge accumulation unit 208 can be ended early.

Similarly as the public address device 2 of the first embodiment (FIG. 2), the public address device 2 according to the present embodiment uses the charge accumulation unit 208 to secure sufficient loudspeaker output while performing the power limitation to suppress the input power. However, the period during which the sufficient loudspeaker output can be secured depends on the capacity of the charge accumulation unit 208, and is limited to only the beginning in the continuous-sound output period Ts. Therefore, when the terminal voltage of the charge accumulation unit 208 drops to the voltage determination threshold Vth, the amplitude limitation is performed to drop the loudspeaker output, and charging of the charge accumulation unit 208 is started. Therefore, the charging of the charge accumulation unit 208 is started (time t12) without waiting for the end of the continuous-sound output period Ts (time t15), and the charging of the charge accumulation unit 208 can be ended early (time t14). Therefore, in a case where a plurality of continuous sounds is sequentially output with a short pause period interposed therebetween, it is possible to secure sufficient loudspeaker output for the beginning of each continuous-sound output period Ts.

Figure 9:
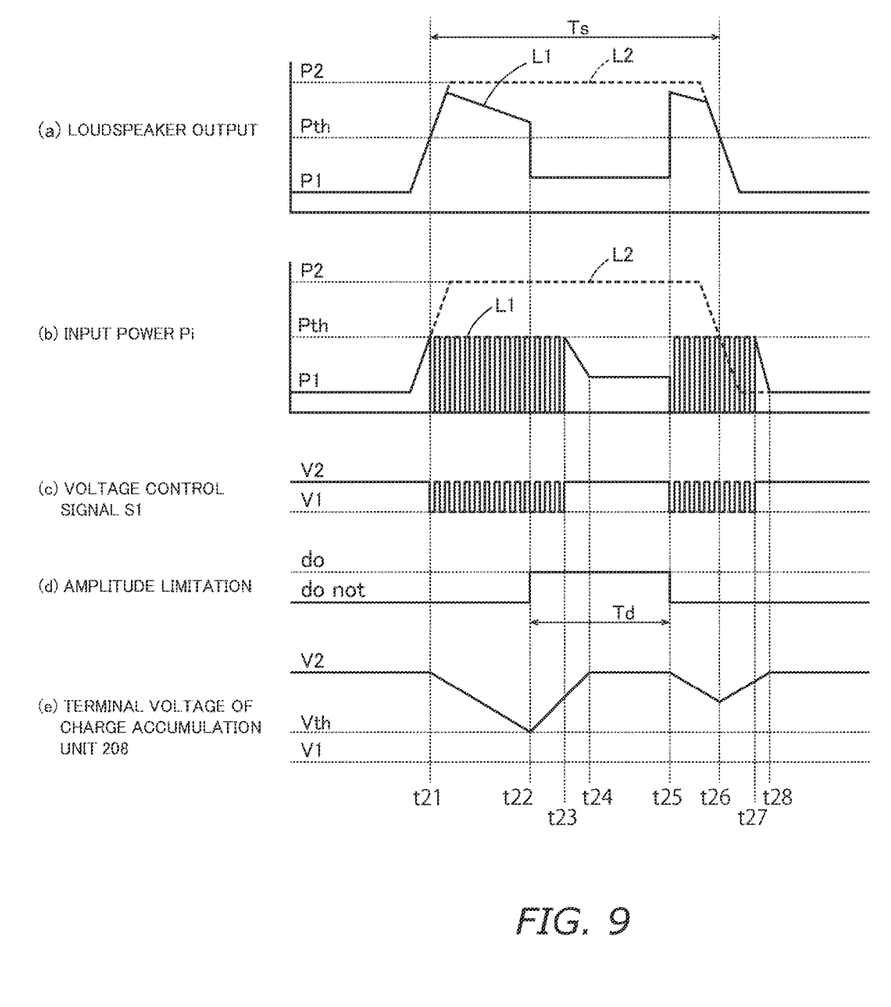
FIG. 9 is a timing chart illustrating another example of the operation of the public address device 2 of FIG. 7.

FIG. 9 is a timing chart illustrating another example of the operation of the public address device 2 of FIG. 7, and illustrates a state at a time when a sound signal for outputting a sound slightly longer than the case of FIG. 8 with large volume is given.

The operation until time t24 is the same as the operation until time t14 in FIG. 8. In FIG. 9, amplitude limitation is released at time t25, but loudspeaker output decreases and reaches the power determination threshold Pth at time t26 after time t25 since the sound signal outputs a sound slightly longer than that in FIG. 8.

When the amplitude limitation is released during a continuous-sound output period Ts during which a characteristic L2 exceeds the power determination threshold Pth, the loudspeaker output exceeds the power determination threshold Pth, and thus the power limitation is started again (time t25). That is, the output voltage of the voltage transforming unit 204 vibrates, so that the input power is suppressed not to exceed the power determination threshold Pth. At this time, power source supply to the power amplifier 202 is mainly performed by discharging of the charge accumulation unit 208, and the terminal voltage of the charge accumulation unit 208 gradually drops.

Thereafter, before the terminal voltage of the charge accumulation unit 208 drops to the voltage determination threshold Vth, the loudspeaker output drops below the power determination threshold Pth, and thus charging of the charge accumulation unit 208 is started (time t26). Thereafter, the terminal voltage of the charge accumulation unit 208 gradually rises due to the charging, and the charging current gradually decreases. Then, when the charging current decreases to a predetermined value, the input power becomes equal to or less than the power determination threshold Pth, and the power limitation is released (time t27). Thereafter, the charge accumulation unit 208 continues to be charged, and the charging ends at time t28.

That is, in the continuous-sound output period Ts, after the release of the first power limitation and amplitude limitation, the second power limitation is further started, and immediately thereafter, the continuous-sound output period Ts ends. Therefore, a second amplitude limitation is not started, but the terminal voltage of the charge accumulation unit 208 does not greatly drop, and thus, the charging for a relatively short time allows the return to the higher voltage V2 without performing the amplitude limitation.

Figure 10:
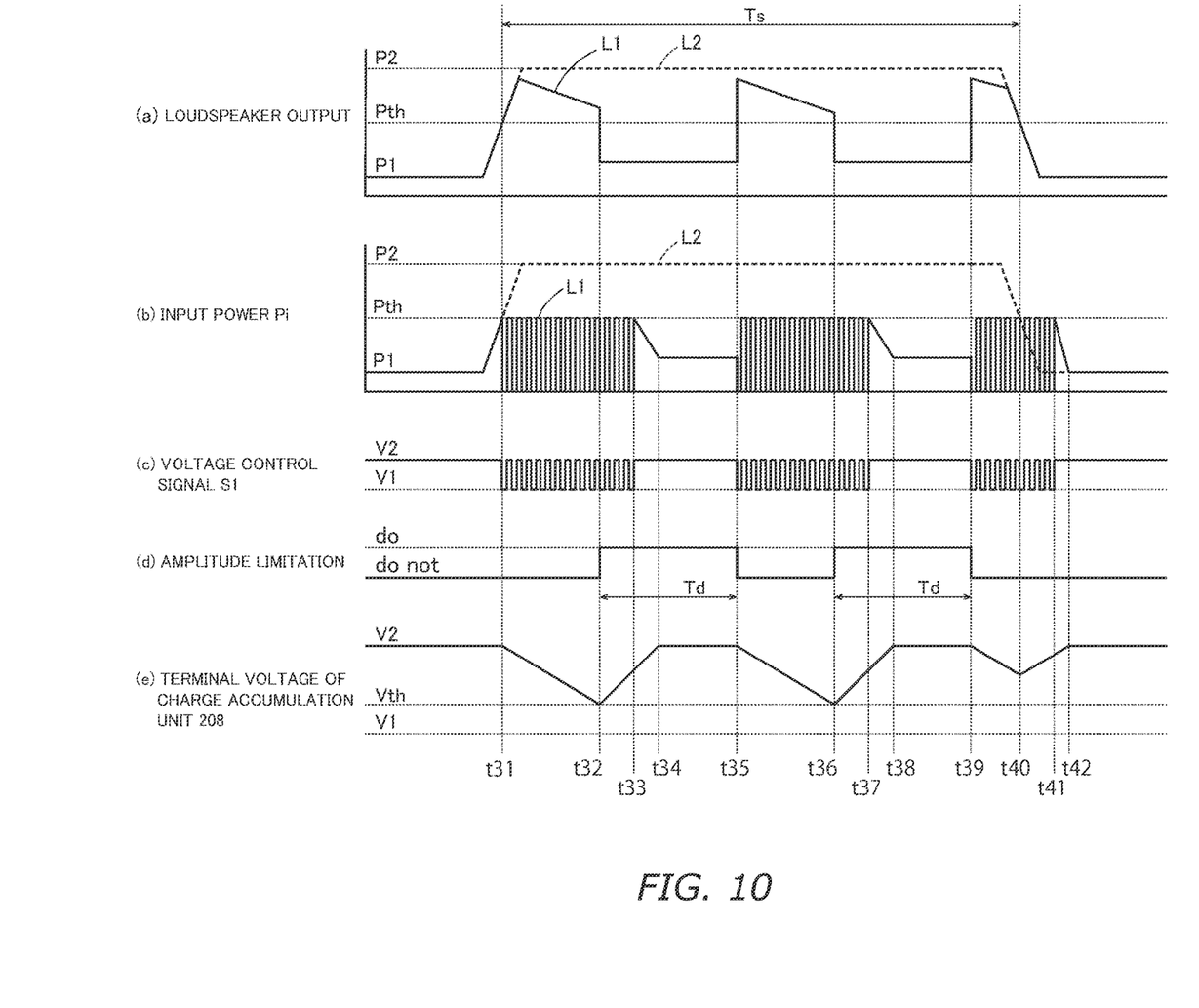
FIG. 10 is a timing chart illustrating still another example of the operation of the public address device 2 of FIG. 7.

FIG. 10 is a timing chart illustrating still another example of the operation of the public address device 2 of FIG. 7, and illustrates a state at a time when a sound signal for outputting a sound longer than the case of FIG. 9 with large volume is given.

The operation until time t35 is the same as the operation until time t25 in FIG. 9. The subsequent operation until time t39 is a repetition of the operation until time t35. That is, when a continuous-sound output period Ts is longer, the same operation is periodically repeated. Then, the amplitude limitation is released at time t39, and then the continuous-sound output period Ts ends at time t40. Therefore, the operation from time t39 to t42 is the same as that from t25 to t28 in FIG. 9.

That is, at the end of the continuous-sound output period Ts, charging of the charge accumulation unit 208 is ended early, and in a case where the continuous-sound output period Ts is long, loudspeaker output exceeding the power determination threshold Pth is periodically repeated. Therefore, the listeners in the address area easily recognize and understand the sound.

Although the public address devices 2 conforming to PoE, PoE+, and PoE++ defined by the IEEE 802.3 standards have been described in the above embodiments, devices to which the present invention is applicable are not limited to devices conforming to the above standards. For example, the present invention can be applied to various public address devices to which a driving power source of a power amplifier is supplied from an external power source device for which upper-limit supply power is defined. As another example of a power supply standard in which upper-limit supply power is defined, there is a universal serial bus (USB) power delivery standard.

In addition, in the above embodiments, an example of a PA system has been described, but the application target of the present invention is not limited to only a public address device constituting such a system. The present invention can be applied to various public address devices that include a power amplifier and amplify input sound. For example, the present invention can be applied to a public address device to which an electroacoustic transducer, such as a loudspeaker, headphones, or earphones, is connected, and that amplifies a sound signal to generate a driving signal and outputs the driving signal to the electroacoustic transducer. The present invention can also be applied to telephony devices, such as a telephone (loudspeaker phone) having a hands-free telephony function, an interphone, and an intercom.

DESCRIPTION OF REFERENCE NUMERALS

1 sound source device
2 public address device
3 switching hub
4 cable
10 power source device
100 public address system
200 interface unit
201 sound processing unit
202 power amplifier
203 loudspeaker
204 voltage transforming unit
205 power detection unit
205*e* current detection unit
206 voltage control unit
207 threshold holding unit
208 charge accumulation unit
210 voltage detection unit
211 amplitude limitation unit
P1 lower power
P2 higher power
Pmax upper-limit supply power
Pth power determination threshold
S1 voltage control signal
Td amplitude limitation time
Ts continuous-sound output period
V1 lower voltage
V2 higher voltage
Va detected voltage
Vth voltage determination threshold
$i_D$ output current

The invention claimed is:

1. A public address device comprising:
a voltage transforming unit that performs voltage transformation of a direct-current power source input from a power source device;
a power amplifier that amplifies a sound signal using the direct-current power source after the voltage transformation to generate a driving signal that drives an electroacoustic transducer;
a power detection unit that detects input power from the power source device;
a threshold holding unit that holds a power determination threshold corresponding to upper-limit supply power of the power source device;
a voltage control unit that controls an output voltage of the voltage transforming unit on a basis of the input power and the power determination threshold; and
a charge accumulation unit that is connected between the voltage transforming unit and the power amplifier, and supplies a power source to the power amplifier when the output voltage of the voltage transforming unit drops.

2. The public address device according to claim 1, wherein the power detection unit includes a current detection unit that detects an output current of the voltage transforming unit, and the power detection unit calculates the input power on a basis of the output voltage and the output current of the voltage transforming unit.

3. The public address device according to claim 1, wherein the upper-limit supply power is determined in a negotiation with the power source device, on a basis of a predefined protocol, before a start of power source supply from the power source device.

4. The public address device according to claim 1, wherein
the supply device performs power supply in accordance with an IEEE 802.3 standard having a plurality of power classes,
the public address device further comprises a PoE interface unit that determines one power class from the plurality of power classes through a negotiation with the power source device, in accordance with the IEEE 802.3 standard, before a start of power source supply from the power source device, and
the upper-limit supply power is upper-limit supply power defined by the IEEE 802.3 standard corresponding to the power class determined by the PoE interface unit.

5. The public address device according to claim 1, wherein
in a case where the input power exceeds the power determination threshold, the voltage control unit controls the output voltage so that the output voltage becomes a first voltage, and in a case where the input power is equal to or less than the power determination threshold, the voltage control unit controls the output voltage so that the output voltage becomes a second voltage higher than the first voltage, and the first voltage is a value at which the input power does not exceed the upper-limit supply power in a case where the driving signal is at maximum power.

6. The public address device according to claim 1, further comprising an amplitude limitation unit that performs amplitude limitation of the sound signal on a basis of a result of comparison between a terminal voltage of the charge accumulation unit and a predefined voltage determination threshold, wherein the voltage determination threshold is a value between the first voltage and the second voltage.

7. The public address device according to claim 6, wherein the amplitude limitation ends after a predefined amplitude limitation period elapses.

* * * * *